(12) United States Patent
De Groot et al.

(10) Patent No.: US 12,444,512 B2
(45) Date of Patent: Oct. 14, 2025

(54) MODULAR CORE MOLTEN SALT NUCLEAR REACTOR

(71) Applicant: THORIZON HOLDING B.V., Amsterdam (NL)

(72) Inventors: Sander De Groot, Amsterdam (NL); Lucas Marius Pool, Amsterdam (NL)

(73) Assignee: THORIZON HOLDING B.V., Amsterdam (NL)

( * ) Notice: Subject to any disclaimer, the term of this patent is extended or adjusted under 35 U.S.C. 154(b) by 497 days.

(21) Appl. No.: 17/607,547

(22) PCT Filed: May 1, 2020

(86) PCT No.: PCT/EP2020/062205
§ 371 (c)(1),
(2) Date: Oct. 29, 2021

(87) PCT Pub. No.: WO2020/225156
PCT Pub. Date: Nov. 12, 2020

(65) Prior Publication Data
US 2022/0223302 A1 Jul. 14, 2022

(30) Foreign Application Priority Data

May 3, 2019 (EP) ..................................... 19172597

(51) Int. Cl.
*G21C 1/22* (2006.01)
*G21C 3/24* (2006.01)
(Continued)

(52) U.S. Cl.
CPC ................. *G21C 1/22* (2013.01); *G21C 3/24* (2013.01); *G21C 7/30* (2013.01); *G21C 3/54* (2013.01); *G21C 19/205* (2013.01)

(58) Field of Classification Search
CPC ... G21C 1/22; G21C 3/24; G21C 7/30; G21C 3/54; G21C 1/03; G21C 19/205
(Continued)

(56) References Cited

U.S. PATENT DOCUMENTS 2,873,242 A * 2/1959 Treshow ................. G21C 19/10
376/918
2,999,057 A 9/1961 Hibshman
(Continued)

FOREIGN PATENT DOCUMENTS

GB 2 073 938 A 10/1981
GB 2508537 A 6/2014
(Continued)

OTHER PUBLICATIONS

International Preliminary Report on Patentability, issued in PCT/EP2020/062205, dated Jul. 30, 2021.
(Continued)

*Primary Examiner* — Jack W Keith
*Assistant Examiner* — Daniel Wasil
(74) *Attorney, Agent, or Firm* — Birch, Stewart, Kolasch & Birch, LLP

(57) ABSTRACT

A nuclear reactor circuit contains nuclear fuel-containing molten salt in a channel which is substantially vertically arranged and provides an up-down passage. A modular reactor has removable, individual molten salt nuclear circuits. The channel of one circuit contains a non-critical amount of nuclear material, but the channels together create the critical zone of the reactor core. A method of operating a modular nuclear reactor circuit and a nuclear reactor include the use of the circuits.

16 Claims, 6 Drawing Sheets

(51) Int. Cl.
*G21C 7/30* (2006.01)
*G21C 3/54* (2006.01)
*G21C 19/20* (2006.01)

(58) Field of Classification Search
USPC .......................................... 376/171, 360, 911
See application file for complete search history.

(56) References Cited

U.S. PATENT DOCUMENTS

| | | | | |
|---|---|---|---|---|
| 3,154,473 | A * | 10/1964 | Martin | G21C 1/22 |
| | | | | 376/355 |
| 3,403,076 | A | 9/1968 | Bettis | |
| 4,342,721 | A * | 8/1982 | Pomie | F28D 7/1669 |
| | | | | 376/405 |
| 2008/0123796 | A1* | 5/2008 | Hyde | G21C 1/024 |
| | | | | 376/261 |
| 2009/0279658 | A1 | 11/2009 | Leblanc | |
| 2015/0243376 | A1 | 8/2015 | Wilson | |
| 2016/0005497 | A1* | 1/2016 | Scott | G21C 1/22 |
| | | | | 376/360 |
| 2016/0329113 | A1* | 11/2016 | El-Genk | G21C 3/06 |
| 2017/0117065 | A1 | 4/2017 | Scott | |
| 2018/0090237 | A1* | 3/2018 | Filippone | G21C 1/328 |

FOREIGN PATENT DOCUMENTS

| | | |
|---|---|---|
| JP | 57-1991 A | 1/1982 |
| JP | 7-49391 A | 2/1995 |
| JP | 2018-49027 A | 3/2018 |
| WO | WO 2013/116942 A1 | 8/2013 |
| WO | WO 2017/070791 A1 | 5/2017 |
| WO | WO 2017/098228 A1 | 6/2017 |

OTHER PUBLICATIONS

International Search Report, issued in PCT/EP2020/062205, dated Sep. 7, 2020.
Written Opinion of the International Searching Authority, issued in PCT/EP2020/062205, dated Sep. 7, 2020.
English translation of the Japanese Office Action for Japanese Application No. 2022-512478, dated Nov. 27, 2023.

* cited by examiner

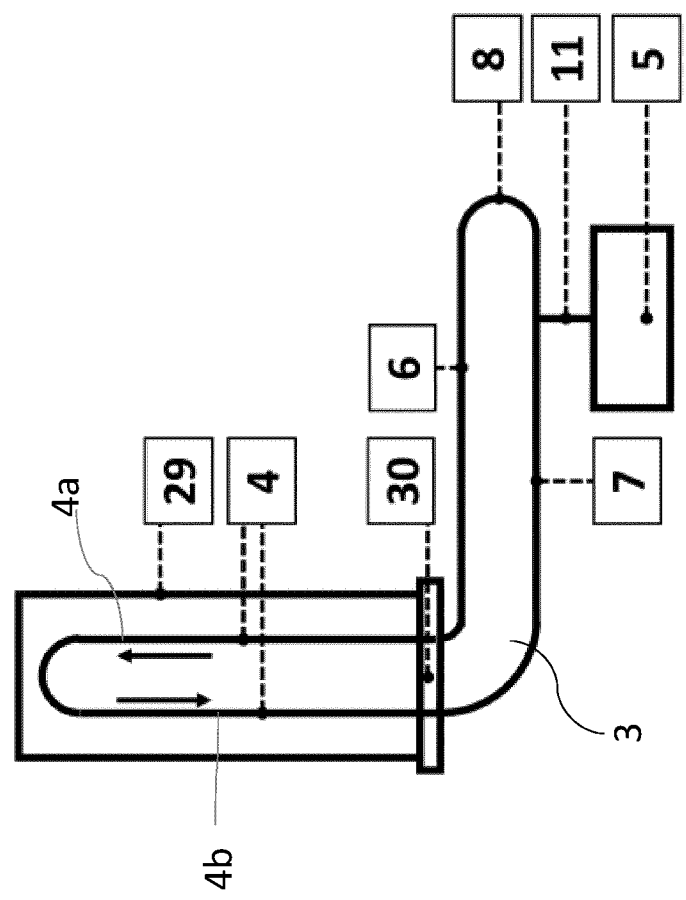

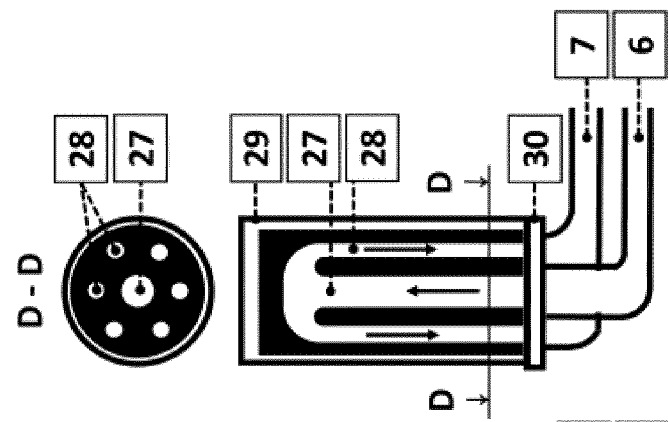
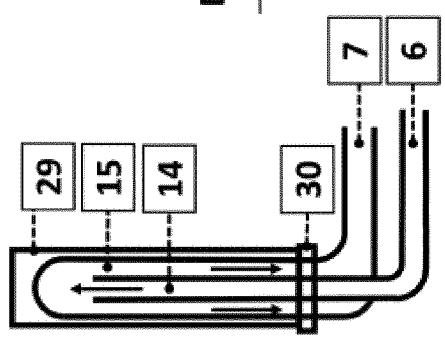
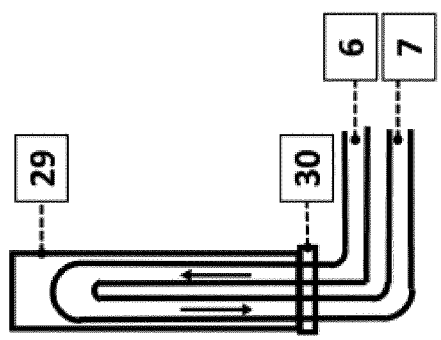

MODULAR CORE MOLTEN SALT NUCLEAR REACTOR

The invention relates to a modular nuclear reactor circuit, in particular a modular molten salt nuclear reactor circuit. The present invention also relates to a modular nuclear reactor, in particular a modular molten salt nuclear reactor composed of nuclear reactor circuits. The invention further pertains to a method of operating a modular nuclear reactor circuit. The invention further pertains to a method of operating a modular nuclear reactor and to a method of testing/qualifying a nuclear reactor. The invention also pertains to a method of exchanging part of a nuclear reactor circuit.

With the world's increasing demand for energy, there remains a need for nuclear energy despite the disadvantages associated with early generation nuclear plants. New generations of nuclear plants ($4^{th}$ and $5^{th}$ generation) are being developed that specially aim to supply safe and clean abundant amount s of energy and at the same time take a conscious approach to the proliferation of nuclear material and the generation of nuclear waste.

One of these are so-called molten salt reactors.

A molten salt reactor (MSR) is a type of nuclear reactor where the primary coolant, or even the fuel itself is a molten salt mixture. There have been many designs put forward for this type of reactor and a few prototypes built. The early concepts and many current ones rely on nuclear fuel dissolved in molten fluoride salt. The fluid would reach criticality by flowing into a core where a moderator such as graphite can be present. Many known concepts rely on fuel flowing through channels in a graphite matrix with the molten salt providing low pressure, high temperature cooling. Some newly developed concepts exclude the use of a moderator to create a fast neutron spectrum system characteristic, or adopt specific moderation to generate dedicated neutron spectra locally, for specific purposes, for example burning of long-lived actinides from nuclear waste streams.

Even though molten salt reactors have been successfully designed, built and operated in the past, the knowledge and experience required for this reactor type to be redeveloped is limited. The key advantages of molten salt reactor systems concerning safety, minimal waste streams, and maximized resource efficiency, have been elaborated in many instances, and with increasing frequency in the last five to 10 years. The large perspective of especially thorium fuelled molten salt reactor systems, to provide safe energy for millennia, with a minimal radioactive waste burden, can be considered beyond doubt. Technical and economic viability, and the long time to market however, are a major obstacle for timely implementation and thereby for investment, even though the proof of principle of molten salt reactors has been successfully shown by the molten salt reactor efforts in the 50s and 60s in the US.

Molten salt reactors in general offer optimized neutron economy, by allowing frequent cleaning of the salt from neutron absorbing fission and activation products, thereby minimizing neutron losses, offering the opportunity to close nuclear fuel cycles, in which the fuel used for fission is generated from excess neutrons from the fission reaction, allowing transmutation of fertile elements such as $^{232}$Th or $^{238}$U, to fissile elements such as $^{233}$U and $^{239}$Pu.

The perspective of closing nuclear fuel cycles, creating very high efficiency in resource usage, in combination with very high levels of (passive) safety, and minimized long-lived waste generation, especially in case of the Thorium closed fuel cycle, renders molten salt reactors a very large promise as a responsible future energy source.

With fuel and coolant combined in the MSR system, the technology has one key major complexity: all physics and engineering disciplines come together in the primary system, and influence each other significantly. In the molten salt primary system components, chemistry, neutron physics, material science, thermal hydraulics, thermomechanics, etc. all come together. Establishing a molten salt reactor therefore requires a multidisciplinary approach, with multidisciplinary analyses and design, and multidisciplinary experimental validation. A significant amount of effort will be needed to develop and validate the multidisciplinary design tools, codes and licensing framework for molten salt deployment. Considering the multidisciplinary complexity, even straightforward in-pile experiments or small-scale demonstrations, will be difficult to fully predict and justify from safety point of view, if an quate and proven multidisciplinary knowledge and experience base is lacking.

This invention elaborates a minimized time to market approach for MSR based power plants, by proposing an efficient nuclear qualification approach, encompassing full multidisciplinary complexity, and by proposing MSR power plant design principles that would make best use of the nuclear qualification strategy. This would largely eliminate complicated in-between steps that are both costly and time consuming. This combination of an effective nuclear qualification route and a design that matches the qualification closely, could lead to molten salt based nuclear power plants becoming commercially available within a 15 years' timeframe, which is significantly shorter than the 20 to 30 years currently regarded realistic. This estimate assumes viability of MSR technology, which can be assumed proven by successful operation in the 50s and 60s in the US.

Molten salt nuclear reactors have been described previously, for instance in US2015/0243376, US2017/0117065, WO2017/098228, GB2508537, WO2017/070791.

In molten salt reactors, the coolant fuel composition can be adjusted and therefore conditioned during operation. This is not the case for the structural materials and components in the primary system of known MSRs. Interaction between the coolant fuel and the components and materials of the primary systems, and the intense radiation field primary materials and components will be exposed to, are major challenges. Materials that can withstand these severe conditions for the lifetime of 40-60 years normally foreseen for nuclear power plants are needed or need to be tested. Many MSR pre-conceptual designs either neglect this aspect or include some kind of radiation shield buffer or sacrificial material layer, to protect the primary material from radiation induced deterioration and chemical salt interaction.

One of these MSR designs is described in U.S. Pat. No. 2,999,057. In U.S. Pat. No. 2,999,057 a loop-based design is used for a complete nuclear reactor in which several individual streams of liquid are fed into and withdrawn from the reaction core, circulated and are fed back into the core or moderator. The design is such that the moderator containing a number of channels where the streams of liquid are fed into the bottom of the moderator and come out at the top in a singular flow. The whole set up is a completely fixed design.

US2009/0279658 also discloses a molten salt reactor in a two-fluid reactor design. In this design, which is basically a vessel filled with molten salt in which individual tubes are present in a fixed configuration through which also a molten fuel salt is pumped. The dimensions of the tubes and the fissile content are such that each tube is subcritical and only criticality is achieved when the tubes are proximate to each other. The design is a fixed design, consisting of one large vessel/containment in which the tubes with salt circulating are located in a fixed configuration, without a removal and replacement possibility of the in core components. The vessel has a single molten salt inlet and outlet.

U.S. Pat. No. 3,403,076 describes a fixed molten salt fuel breeder in which graphite fuel cells having vertically placed passageways are provided through which molten fuel salt can be pumped enrobed in a blanket of molten salt as a heat exchanger. This system has one single large reactor pressure vessel, and the graphite fuel cells are fed with molten salt via a single inlet and outlet.

GB2073938 displays a single reactor vessel and containment filled with molten salt through which tubing with molten fuel salt is led. It is a single containment provided with salt with a single inlet and outlet.

All these configurations share that the whole set-up is fixed. Tubes or fuel cells conveying molten fuel salt are placed in a critical configuration and placed in an encompassing large reactor vessel/containment, with a single salt inlet and outlet, circulating primary or blanket salt in a reactor vessel volume or tubes or fuel cells centrally.

In general, the reactor concepts adopting a liquid fuel-coolant devised in the prior art, use and teach a relatively large and undivided salt volume, filling the system core and supporting piping and equipment. This poses a number of issues for feasibility of these kinds of systems. A large encompassing vessel is required to maintain nuclear material containment. These large vessels are complicated to make and handle, expensive, not (easily) replaceable, and not (easily) discardable after use. The 'Defence in depth' concept is the cornerstone of nuclear safety philosophy and stresses the use of multiple barriers to avoid release of the nuclear source term contained. One vessel containing all the fuel, maximizes the source term in one containment, and forms one single first line of defence against release. After use a large vessel is contaminated and can have been neutron-activated, which is a major waste issue in itself. Even more so if the vessel and components connected to it are still filled with the highly active and toxic fuel-coolant waste. Handling, storage and disposal of this volume is difficult due to size and potential radioactivity exposure hazard. A large vessel, forming the containment, complicates the replacement of core components, as the vessel needs to allow opening and entering, and export and introduction of the components. Core components and materials in fuel-coolant based systems generally suffer heavily from radiation damage under extreme temperature and chemical (corrosion) conditions. Convenient replacement of core materials and components will significantly accelerate the implementation these systems, as materials that can withstand the harsh conditions in the critical zone of fuel-coolant based systems for prolonged duration, have yet to be found or developed.

The present inventors have now, in essence, found an improved design for a molten salt nuclear reactor circuit. The improved design provides more flexibility, for instance in that a single circuit can be built and tested before assembling into a complete nuclear reactor. The circuit is constructed such that the circuit can be placed and removed from the reactor or the moderator without disassembly of the whole reactor or without affecting (disassembling, removing) the other circuits in the reactor.

The fundamental choice made by the inventors is compartmentation of the molten fuel-coolant into separate, individual and independent modules, placed in a constellation where a stable nuclear fission reaction can be maintained in the core region, consisting of the core parts of the modules. Each module has an independent functionality, and has its own pump, heat exchanger and processing units. Each module is a self-contained system, with its own (double) containment. The modules may be only connected via the secondary non-nuclear coolant system(s) or other secondary systems. The modules hence do not share molten salt or nuclear material, each module is provided with its individual amount of molten salt and nuclear material. Each module is a separate nuclear reactor on its own, yet can only achieve criticality once two or more modules are placed in proximity to each other.

The modules are placed in each other's proximity in such a way that they can be easily removed. Each module or circuit is independently removable from the nuclear reactor. An example is given in FIGS. 6 and 7. The (exemplary: cylindrical) design of the module allows side by side placement, while removal of one module from the array can be done for instance by elevating or lowering of the relevant module.

The invention in general pertains to a nuclear reactor comprising nuclear reactor circuits, a nuclear reactor circuit, and methods for operating the nuclear reactor and the nuclear reactor circuit.

The nuclear reactor circuit of the invention is not a conventional MSR reactor vessel filled with salt, but a configuration of pipes, pipe bundles or channelled blocks/cylinders, through which the salt is circulated in individual and independent circuits. The individual nuclear reactor circuits and the molten salt circuits therein are not coupled to each other or connected to each other by a blanket salt circuit.

The individual nuclear reactor circuits are independent from each other and can be operated independently.

This is a difference with the prior art set-ups in which the molten salt circuits are one system connect to each other by a central primary or blanket salt circulation system. The prior art molten salt set up is typically undivided. The nuclear reactor concept of the invention is hence a modular concept. Individualised nuclear reactor circuits or modules which are separately constructed and modular salt loops are placed in its other proximity yet do not share tubing, molten salt or fuel. Each module contains its own molten salt, fuel and tubing. Each module is a separate compartment of the nuclear reactor.

U.S. Pat. No. 2,999,057 shows, for instance in FIG. 6 a setup in which conduits converge to proximity to form a core and then diverge. However, the whole setup remains fixed and cannot be removed from the reactor without complete disassembly of the reactor.

The modular core approach of the present invention allows the following benefits:

Each module maintains at least two containments (i.e. two lines of defence), and the integrity of both can be monitored continuously, by measuring fission product content in the gas flowing in between first and second containment, and in the coolant at the outside of the second containment.

Monitoring of containment allows the use of disconnectable primary containment components. Normally primary boundary integrity is secured by welding or brazing, turning the primary boundary into one single component, leaving no doubt the containment is closed. By monitoring integrity of the containment, disconnectable components can be allowed.

Each module contains a part of the total fuel-coolant volume, i.e. the source term per containment is reduced.

Each module contains a subcritical amount of fuel-coolant, which cannot introduce criticality at module level. Only when modules are placed in a specific configuration, with the fuel-coolant of multiple modules combined, a fission reaction can start and be maintained.

When a module fails, the fuel-coolant in that module can be passively drained from the critical core region, and the criticality in the total core is reduced or stopped, while the rest of the module functionality is not affected.

Large components are avoided, reducing cost, facilitating handling, transportation (with feasible container sizes) and replacement. For example large parts or entire modules can be extracted and replaced, providing opportunity to prolong system life by replacement, but also allow introduction of new modules with improved performance or another fuel-coolant.

As the total fuel-coolant inventory is subdivided in the modules, the fuel-coolant waste volume is dealt with at module level, i.e. manageable volumes that are transportable and can be further processed at a separate location.

Modules in the reactor can be placed in and taken out of the reactor without complex deconstruction of the whole reactor. Replacement of modules can be achieved by elevating or lowering the modules from the array of modules making up the reactor and requires only the disconnection of secondary connections such as instrumentation, electric power, secondary heat exchangers etc.

The modular core approach leads to a suboptimal core configuration from neutron physics point of view, because the configuration is determined by the practical design considerations at module level, for example replaceability and the introduction of containments per module in the critical core zone. The inventors prioritised nuclear safety, as it is a prerequisite for fuel-coolant systems to become practically feasible. Even though this approach limits the possibilities to optimize the core configuration to maximize neutron economy, adopting a fuel-coolant offers benefits to compensate for the neutron economy drawbacks of the chosen modular approach. The use of fuel-coolant offers potential for higher neutron efficiency than solid fuel reactors, especially in case unwanted neutron absorbing fission products in the fuel-coolant can be effectively removed online. Fuel-coolant systems have a low pressure, hence containments can be kept relatively thin, as they primarily serve a low pressure liquid and gas barrier. The negative impact on core performance by neutron absorption of containment materials in the reactor core region can therefore be minimised, while safety and relative quick development, licensing, approval and implementation duration are optimised.

The set-up of the nuclear reactor circuit of the invention (being singular pipes, multiple pipes, pipe bundles or channelled blocks/cylinders), allows for nuclear testing and qualification of the circuit system by a single circuit system in an appropriate nuclear testing reactor facility.

In one aspect, the nuclear reactor circuit of the invention contains a loop which is capable of containing and/or circulating a nuclear fuel. The loop contains a, optionally substantial straight, channel in a substantial vertical arrangement. The channel provides for an up and down passage for the liquid in the loop.

The individual molten salt nuclear circuit, or a representative version thereof, can be placed in the radiation field of an existing reactor (an appropriate material test reactor for example), and can thus be used to design, develop, test and certify materials and components for a molten salt nuclear reactor circuit.

The individual molten salt nuclear circuit can be used as a component of a molten salt nuclear reactor, which in turn, is made up of a plurality of such individual circuits.

In another aspect, the invention pertains to a nuclear reactor that contains one or more of the circuits of the invention. A nuclear reactor containing one circuit can be used to validate and test the circuit. A plurality of circuits can be combined to form a nuclear reactor based on the individual molten salt circuits.

The nuclear reactor comprises a core area and a shell area. The core area is surrounded by the shell area. In the nuclear reactor, a plurality of nuclear reactor circuits are provided. Each nuclear reactor circuit of the nuclear reactor comprises a loop that contains one or more channels.

The loop is capable of containing a liquid containing fertile and/or fissile materials. one or more liquid tanks are arranged, optionally detachable, in connection with the loop and capable to contain the liquid containing fertile and/or fissile materials. The channels of the plurality of circuits are arranged in the core area. The arrangement of the channels in the core form the critical zone of the nuclear reactor, sustaining a nuclear fission reaction.

The channels of multiple individual circuits can be placed in a critical configuration in an inherently safe and effective configuration to develop and operate a molten salt nuclear reactor. The individual circuits each contain a sub-critical amount of nuclear fuel. The channels of the individual circuit configuration each can contain a sub-critical amount of nuclear fuel.

The nuclear reactor, built from individual circuits, allows for fuel cycle flexibility (the circuits may contain different fuels/salt combinations or fuel/salt combinations can be changed), the primary components of the circuits and hence of the nuclear reactor are replaceable. By having circuit and reactors in which primary components are replaceable, the life cycle of a reactor can be prolonged and reliably managed. The nuclear reactor circuits and the reactors built therefrom also allow for further optimisation as components of the system can be replaced by new and improved components. The design of the circuits is such that the elements of the circuits can be individually tested and certified. The design of the nuclear reactor circuit (or loop) and also of the nuclear reactor that is built from these loops express an improved safety profile since the configuration allows for a design wherein the nuclear reactor stops functioning when one or more of the molten salt nuclear circuits deviates from its desired function.

In essence, the reactor is based on multiple, individual circuits, that can be placed in a circular arrangement, with one part of each circuit located at small radii ("the channel" or "hot leg"), creating a critical configuration sustaining a nuclear reaction ("the critical zone"), and with the rest of the circuit located at larger radii, largely outside the radiation field of the critical zone, in a non-critical configuration. Circuit channels or piping is in direct contact with the salt. The channels contain salt and form the critical zone of the reactor, by providing adequate amounts of fissile material in a critical configuration formed by combined channels, and use of moderating materials in case an (epi-) thermal neutron spectrum reactor is targeted. The channels are exposed to high radiation fluxes. The use of pipes allows for the replacement as soon as material limits are reached in terms of radiation exposure and/or salt exposure and are relatively easy to replace. The channels can be single pipes or pipe bundles or blocks with channels, deteriorating relatively quickly due to exposure to high radiation fluxes in the reactor critical zone in combination with contact with (corrosive) salt and fission products, and are relatively small components that can be replaced as well, increasing the reactor lifetime. Even though primary piping and channel replacement requires significant remote handling development, this is regarded more feasible than attempting to find and qualify materials that can withstand MSR conditions for decennia.

Alternatively, the circuit can be made in a vertical disposition in which the channels are at the top half of the circuit and the other components are at the bottom, such as exemplified in FIGS. 6 and 7. Placing the vertically disposed circuits together, the channels are within each other's proximity, allowing neutron exchange between modules, establishing a critical core configuration, in which a nuclear fission reaction can be sustained. Removal of one circuit or deactivation of a circuit by draining the molten salt from the channels into the tank in the lower half disrupts criticality of the reactor.

Nuclear reactor comprising a plurality of separate and individual nuclear reactor circuits or modules, wherein each module contains an molten salt liquid and fertile or fissile materials as a nuclear fuel in a non-critical amount as a primary system, wherein each module is connected to a secondary system of the reactor, wherein each module is positioned in the reactor in a configuration with other modules, wherein each module is placed within the neutron flux of one or more other modules, wherein the plurality of modules contain a critical amount of fertile and/or fissile materials when combined and placed in the configuration and within the neutron flux of the one or more other modules, wherein each module is individually removable from the reactor system by detaching (parts of) the module from the secondary system while maintaining the configuration of the other modules in the reactor, wherein the primary system of a module comprises a pump, primary heat exchanger and primary processing means such as a drainage tank, either separate or integrated in the circuit, wherein the secondary system comprises secondary control means and secondary non-nuclear heat exchangers that may exchange heat with the primary heat exchangers of the modules.

In embodiments, the modules may have a vertically elongated polygonal or cylindrical shape. In embodiments, the primary system is a (closed) loop in a vertical configuration in the module. In embodiments, the modules containing molten salt loops are placed predominantly in the upper half of the vertically elongated polygonal or cylindrical shape and the further element of the primary system such as a pump, primary heat exchanger and primary processing means such as a drainage tank are placed in the lower half. When modules are placed in configuration, the configuration, places the molten salts loop of one module in the neutron flux of other modules to achieve a critical configuration to maintain a nuclear reaction and generate energy.

In a further aspect, the invention pertains to a method of operating a nuclear reactor circuit by arranging the channel of a nuclear reactor circuit, or a representative version of the nuclear reactor circuit, near the core of another nuclear reactor such that the channel of the circuit is exposed to the neutron flux of the reactor. This simulates circuit operation in a nuclear reactor composed of a multitude of reactor circuits, with the purpose of testing, characterisation and qualification of circuit materials, circuit fluids, and circuit components, in a representative test environment, including MSR multidisciplinary complexity.

In a further aspect the invention pertains to a method of operating a nuclear reactor that comprises the steps of providing a nuclear reactor comprising nuclear reactor circuits of the invention and possibly a (neutron) moderator. The method further comprises providing a plurality of nuclear fuels containing fertile and/or fissile materials and providing the plurality of nuclear fuels to the plurality of circuits. The nuclear fuel in part of or all of the channels, and the configuration of moderator materials and/or the channels, create a critical zone, in which a nuclear fission reaction can be sustained. The method of the invention allows that the circuits of the present invention can be used in a nuclear reactor for a variety of purposes, some of which are the generation of energy, the use as a breeding facility by using neutrons/neutron absorption to convert fertile elements into fissile elements, thereby generating nuclear fuel, and/or the generation of isotopes and materials for other applications and combinations thereof. The modular construction of the nuclear reactor with the nuclear circuits of the invention allow that the operation of the nuclear reactor can be used to meet various needs at the same or subsequent times without drastic alteration to the configuration of the reactor, but by the alteration of individual circuits, and/or alteration of the liquids contained in the circuits, and/or alteration of moderating materials.

BRIEF DESCRIPTION OF THE FIGURES

FIG. 2 shows a schematic representation of the nuclear reactor circuit.

FIG. 3A-C show a schematic representation of a nuclear reactor circuit (side view) wherein the channel is placed at a distance of the return line and in a substantial vertical position. The channel contains a two way flow established by U-bend tube or U-bend tubes, a tube-in-tube, or a channelled block configuration.

DETAILED DESCRIPTION

Figure 1A:
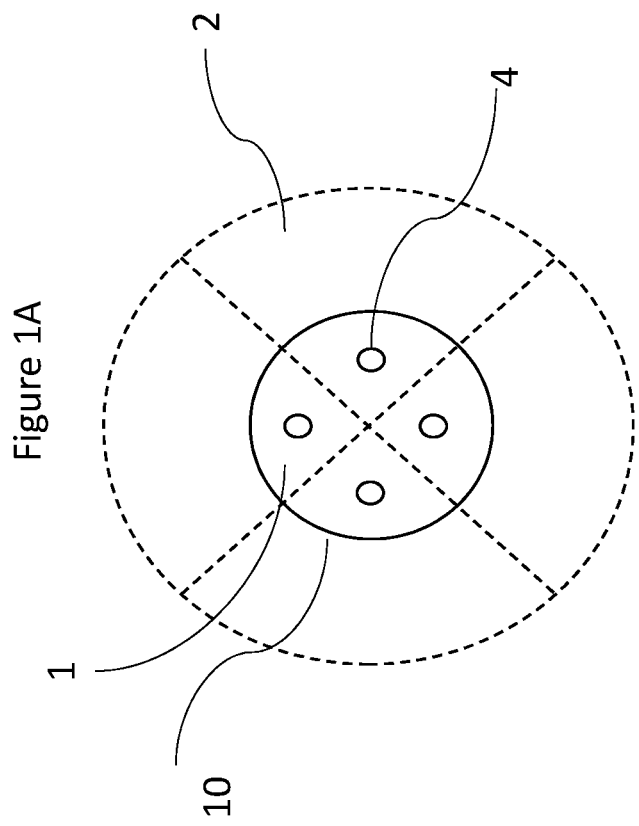
FIG. 1A shows a schematic representation of a top view of four individual circuits (separated by schematic dotted lines) with channels located in the points of the pie-like representation. When placed in a reactor, the channel (4) is the section of the nuclear reactor circuit in closest proximity to the other separate nuclear reactor circuits which together form the nuclear reactor core, by generating a combined critical balance of neutrons through their individual (sub critical) neutron contributions.

The present invention in one aspect pertains to a nuclear reactor circuit comprising a loop (3), wherein the loop (3) is capable of containing a liquid containing, and optionally circulating, fertile and/or fissile materials as a nuclear fuel, wherein the loop (3) contains a, preferably substantially straight, channel (4) that is part of the loop and that is arranged in a substantial vertical arrangement, wherein the channel (4) provides an up-and-down passage (4a,4b) for the liquid in the loop.

A nuclear reactor circuit according to the invention may comprise a loop (3) that contains a channel (4) and can be connected to a liquid tank (5). A loop may contain a feed line (6), a channel (4), an outlet line (7), a return line (8). In the loop, the feed line, the channel, the outlet line and the return line are connected and arranged to form the loop that is capable of containing a liquid. The liquid can contain fertile and/or fissile materials. The liquid tank is connected to the loop and is arranged and capable to contain the liquid. The channel of each loop can be independently positioned in a substantial vertical arrangement.

An advantageous feature of the present invention is the accommodation in an individual circuit of up-flow, flow reversal and down-flow in the channel when it is positioned in a substantial vertical arrangement. This configuration allows encompassing the channel in containments that can be closed at one end, preferably the top, and connected to the circuit at the location where the channel is connected as well. This allows convenient disconnection, removal and replacement of containments and the channel vertically, through the upper reflector and/or radiation shield of the reactor containment. For MSR systems, with core components being exposed to a combination of high temperatures, high radiation fluxes and potentially detrimental chemical interaction with molten salt and its constituents, convenient regular replacement of core materials and components is an important aspect for reactor lifetime and economy.

The channel can be releasable connected (i.e. connected such that it can be released, optionally together with the containment (29)). By providing the channel as an up-and down passage, the feed and the outlet are positioned at the same side (top or bottom) of the circuit. This allows that the circuit (and/or the channel) can be removed from its environment, either the nearby reactor core where the circuit was placed to be irradiated or to interact with the radiation from the nuclear reactor) or from the moderator in case the channel of the circuit was placed in the moderator of a reactor. The removal can then be achieved by lifting or lowering the (released) channel and/or the entire circuit from the reactor, without having to disassemble the reactor. This provides a huge advantage over conventional (molten salt) reactors as it allows that parts of the reactor can be replaced, repaired or otherwise manipulated without having to disassemble (a large part of) the reactor.

The channel can be encompassed or enclosed in a containment that is also removable and/or replaceable. Between the containment and the channel an inert gas can be present, which may act as thermal insulation, can be monitored (online) to detect salt leakage, and can be used for (pre-) heating of primary components.

The rest of the circuit also respects defence-in-depth designs by appropriate layers of defence to avoid radioactive materials release by containments or confinements. Similar to the channel containment function and gas gaps can include circuit system heating and/or leakage monitoring/detection functions.

In between the separate (contained) channels moderator material can be located or avoided to adjust and optimize the neutron spectrum tailored to the fuel cycle envisaged by the system (simple uranium burning cycle, or a thorium-uranium or a uranium-plutonium breeding cycle for example). For a thermal reactor design, the adoption of individual reactor circuits allows for separating the moderator from contact with the salt. Moderator functionality and molten salt containment or molten salt flow guiding functionality are separated, unlike other thermal MSR system designs known or known to be under development.

Thus, in another aspect of the invention a method is provided in which components of a reactor circuit are removed by disconnecting the channel, the channel containment, and/or liquid tank from the circuit and removing the channel, the channel containment, and/or liquid tank from the circuit , or by removing the entire circuit from the reactor. In case the circuit is placed in a reactor configuration, the replaceable connected channel, channel containment and liquid tanks can be removed and/or replaced from the shell or core area of the reactor. In certain embodiments, the removal of the channel, the channel containment, and/or liquid tank from the circuit comprises removing the entire nuclear reactor circuit from the reactor prior to removal of the channel, the channel containment, and/or liquid tank from the circuit. In other embodiments, the channel, the channel containment, and/or liquid tank from the circuit can be removed from the nuclear reactor while the rest of the nuclear reactor circuit remains within the nuclear reactor.

The feed line for the channel is positioned at one end of the channel. The outlet line is positioned at the other end of the channel. The channel has a supply end (feed line) and a discharge end (outlet line) that are both part of and/or connected to the loop such that the supply of the liquid to the channel and the discharge from the channel is at the same side of the channel.

The circuit may contain and circulate a liquid. The circuit comprises a loop that contains a channel (4).

A channel (sometimes identified as a hot leg), as used herein, is the part of the circuit most exposed to neutron radiation by nuclear fission reactions inside the channel and/or outside the channels (when exposed to external neutron radiation), and where the channel and the fluid in the channel are heated by nuclear fission reactions and/or nuclear heating (energy deposited in the channel materials and fluid by radiation absorption). The circuit fluid flows through the channel, in a two-way fashion (up-down or down-up). The channel can be selected form amongst a single pipe going up and down, a pipe bundle, a pipe-in-pipe or a channelled block/cylinder. The channel may enables one-way or two-way salt flow . The channel may be connected to a feed line (6) and a return line (8), supplying liquid to and retrieving liquid from the channel. There is a preference for a channel that allows two-way flow such as a pipe bundle, a pipe-in-pipe or a channelled block/cylinder.

The substantially straight position of the channel preferably applies to the exterior positioning of the channel of the circuit. The channel, in an alternative embodiment, may have an up-and-down passage circling as a corkscrew up (or down) on the outside perimeter of the channel and through the loops of the corkscrew down (or up) to complete the passage.

The channel can connect on one end to the feed line. The channel connects on the other end to the outlet line (7). The outlet line connects to one end to the channel. The outlet line connects to the other end to the return line. The return line connects to one end to the outlet line. The return line connects on the other end to the feed line. This set up of feed line, channel , outlet line and return line provides a closed circuit or loop as it is used in the invention.

Typically, the channel is connected at the two ends (inlet and outlet) of the channel such that the channel is part of a closed loop that is capable of containing and circulating a liquid. On one of these ends, a feed line may be present upstream of the channel and an out line may be provided down stream of the channel. The return line may be located downstream from the out line and upstream of the feed line, such that a loop containing the channel may be provided.

To the circuit one or more liquid tanks (5) can be connected. The circuit is capable of containing a liquid. The liquid may contain fertile and/or fissile materials. The nuclear circuit of the present invention forms a loop wherein the channel can be placed and spaced at a distance from the rest of the circuit, in such a way that, when in operation, the channel can be placed in the flux of an existing nuclear reactor (i.e. an appropriate material test reactor). The channel itself and the contents of the channel can be subjected to the radiation of the existing (test) nuclear reactor. The other elements of the nuclear reactor circuit can be placed further outside the flux of the existing reactor.

This provides a setup in which the materials and the configuration of the nuclear reactor circuit itself can be tested and qualified. The nuclear reactor circuit can thus be used for generic testing, model validation and qualification of a new reactor concept by placing it in the flux of a test nuclear reactor. The one or more liquid tanks connected to the circuit may be used to fill the nuclear reactor circuit and can be used to store the liquid content.

In one embodiment, preferably, the channel does not contain a critical amount of nuclear material, i.e. the channel is sub-critical.

In certain embodiments, the circuit may contain a liquid. The liquid may contain fertile and/or fissile elements. The liquid may be a molten salt. The liquid can be circulated through the circuit, for instance by convection and/or by pump, integrated in the circuit.

Typically, molten salt has a high thermal expansion coefficient. Thus, when using a molten salt, a natural circulation may occur within the loop. The salt within the channel which is heated by the fission reaction, rises to an upper portion of the channel and or is pushed further, where heat can be extracted from the molten salt, for instance via an optional heat exchanger. The molten salt, having a high thermal expansion coefficient, becomes denser and moves with a tendency back via the outline and the return line of the loop and is replaced by salt that has been heated within the active region. As the cooled salt moves through the circuit, it passes through the "critical zone " in the channel, i.e. where it can be subjected to outside radiation. Passing through the critical zone generates heat in the molten salt causing it to become less dense and to circulate to the top of the vessel channel to repeat the process. Thus, a natural flow circulates the hot salt through the circuit and the optional heat exchanger where the heat can be extracted and brings the cooler salt back through the critical zone region where it is heated. This natural circulation can form the primary driver of flow inside the circuit.

The natural circulation effect in the circuit may reduce the need to include a pump in the loop or circuit to circulate the material through the core reaction vessel. Pumps may be provided to supplement this natural circulation effect and/or may be required as primary force for circulation. For instance, when a large amount of energy is generated in the circuit, a pump is preferred to move the heat actively from the channel to a circuit section where the heat is removed.

In certain embodiments, the channel is placed in a substantial vertical arrangement. Substantial vertical in this context means that the liquid in the channel can move through the channel via convection and/or gravity. The channel may be at an angle with the vertical of at most about 45 degrees, with a preference of not more than about 20, 15 or 10 degrees. It has a higher preference that the angle is less than about 5 degrees. It is preferred that the elements of the loop and the circuit are arranged and positioned in such a way that the circuit allows or facilitates passive draining of the fluid into the liquid tank by gravity.

In an embodiment wherein the nuclear reactor circuit is a molten salt reactor that may contain fertile and/or fissile materials, the liquid tank can be connected to the circuit via an actively or passively activated valve or pass-through.

An example of a passively activated pass-through is a salt plug (or freeze plug) (11) in the connection between the circuit and the liquid tank and typically achieved by active cooling of a section such that the molten salt solidifies. This section is typically arranged between the loop and the tank. Once the cooling is deactivated or removed or the temperature rises, the plug will melt and the content of the circuit is drained in the tank. A salt plug is typically useful in case the nuclear reactor circuit overheats, and by passive draining via the salt plug fissile material is removed from the core, effectively reducing or stopping the nuclear fission reaction. The liquid tank is preferably located near the lowest point of the nuclear reactor circuit. A combination of a substantial vertical disposition of at least the channel and the placement of a salt plug and an liquid tank near the lowest point of the circuit allows in cases of emergency (i.e. runaways or overheating) to empty the contents of the circuit in the tank, thus removing fissile material from the circuit and of the critical core region of the reactor, stopping or reducing the nuclear fission reaction in the circuit such that the reactor system is no longer critical. Preferably the tank is located outside the flux of the reactor or at least at a position where the flux of the reactor is not capable of maintaining a nuclear reaction in the circuit. The liquid tank can be used to drain the circuit of liquid (shut-down scenario), and/or to fill the circuit with liquid (start-up scenario). The liquid tank can be adapted for liquid storage and has temperature control capability for salt conditioning purposes. The liquid tank can be removed and replaced. Having removable and replaceable liquid tanks allows for introducing new molten salt compositions in a circuit or managing purification or alteration of the molten salt at an other location. Alternatively, the individual tanks can be drained to a transport tank or container which can be removed and replaced.

In certain embodiments, the circuit may further comprise other components such as an expansion vessel to handle pressure variations and salt volume changes, for example due to thermal expansion. The circuit may further comprise pumps for the transport of the liquid in the circuit, a heat exchanger to heat up the fluid in the circuit or to remove heat from the fluid in the circuit to a secondary medium, used to transport the heat to an energy generation unit. The circuit may further contain or be connected to means for chemical processing, for instance for the removal of impurities, unwanted by-products, neutron absorbing activation or fission products, or elements that are generated in the salt that enhance system degradation by corrosion or deposition. Potential non-proliferation issues with material extraction should be and can be managed by design. The circuit may further contain or be connected to means for the addition and/or removal of one or more of fertile material, fissile material, fission products, source materials for neutron activation, and neutron activated materials, and liquids such as molten salts.

In one embodiment, the liquid tank is a plurality of liquid tanks. The amount of nuclear material in the circuit and/or in the channel may be less than a critical amount (i.e. the channel of the circuit contains a sub-critical amount of nuclear material). In this embodiment, preferably, the channel does not contain a critical amount of nuclear material, i.e. the channel is sub-critical. Thus in certain embodiments, multiple liquid tanks may be provided such that one liquid tank can contain a part of the liquid contained in the circuit and hence only a sub-critical amount of nuclear fuel.

The liquid tanks can be removed from the structure and placed in transport containers to move the liquid to a site for salt clean up, salt composition optimization or other salt processing purposes, including conditioning for waste storage and disposal.

The liquid in the nuclear reactor circuit (and hence in the reactor) according to the invention may contain fertile materials, preferably selected from amongst one or more of $^{232}$Th, $^{238}$PU, $^{238}$U, $^{240}$Pu, $^{242}$Pu and other actinide isotopes.

The liquid in the nuclear reactor circuit (and hence in the reactor) according to the invention may contain fissile materials preferably selected from amongst one or more of $^{233}$U, $^{235}$U, $^{239}$PU, $^{241}$Pu and other actinide isotopes.

In this respect, the term fertile material is material that can be converted to fissile material by neutron transmutation and subsequent nuclear decay. In this respect, the term fissile material is material that can be made to undergo nuclear fission by neutron irradiation (i.e., is fissionable) and also produce neutrons from such fission that can sustain a nuclear reaction in the correct setting. The process of the transmutation of fertile materials into fissile materials by absorption of neutrons is referred to as fuel breeding.

The liquid in a nuclear reactor circuit (and hence in the reactor) according to the invention may contain fissile materials preferably selected from amongst one or more of $^{233}$U, $^{235}$U, $^{239}$PU, $^{241}$Pu and other actinide isotopes.

The liquid in a nuclear reactor circuit (and hence in the reactor) according to the invention may contain long-lived isotopes extracted from nuclear waste such as isotopes from Neptunium, Plutonium, Americium, Curium and other actinides, for example for nuclear waste lifetime reduction purposes.

The liquid in a nuclear reactor circuit (and hence in the reactor) according to the invention may contain isotopes specifically intended to generate activation or fission products that have a medical or industrial use, varying from enriched stable isotopes such as $^{176}$Yb (to generate $^{177}$Lu), $^{160}$Gd (to generate $^{161}$Tb), to selected semi-stable or unstable isotopes such as to $^{235}$U/$^{233}$U/$^{239}$Pu (to generate $^{99}$Mo, $^{90}$Sr and $^{131}$I by fission), $^{237}$Np (to generate $^{238}$Pu) and $^{226}$Ra (to generate $^{227}$Ac, $^{228}$Th, $^{229}$Th, $^{225}$Ac etc.), amongst others.

The liquid in the nuclear reactor circuit according to the invention can be a molten salt. In a preferred embodiment, the molten salt is selected from fluorides and/or chlorides, preferably one or more of LiF, NaF, KF, RbF, BeF$_2$, ZrF$_4$, LiCl, NaCl, KCl, RbCl, BeCl$_2$, ZrCl$_4$ and mixtures thereof.

The channel of the present invention is made out of a material that can withstand corrosion by the molten salt in the circuit sufficiently, with minimized degradation due to neutron flux and radiation, whilst minimizing neutron absorption to allow neutron economy optimization. A material that has a high resistance against the corrosive effect of the molten salt, can withstand radiation damage relatively well, and has a low neutron absorption. Suitable material can be Molybdenum alloys, graphite, silicon- and other carbides.

The channel of the present invention is in its simplest form a single tube (pipe) or channel. In one embodiment, the channel (4) comprises an up tube (4a) and a down tube (4b) that are connected to each other at the top or at the bottom. This may also be envisaged as a U-shaped tube with the bend at the top or at the bottom (single pipe), preferably at the top. Thus, preferably, the channel is a U-shaped tube, wherein the feed line and outlet line are each independently positioned at or near the lower end (in the lower half) of the channel (FIG. 3A).

In one embodiment the channel is a pipe-in-pipe (FIG. 3B). A pipe-in-pipe (double pipe, two way) comprises an inner tube (14) located inside an outer tube (15), wherein the inner tube has a smaller external diameter than the internal diameter of the outer tube, wherein one end (preferably the bottom end) of the inner tube is connected to the feed line and one end of the outer tube (preferably the bottom end) is connected to the outlet line, wherein the outer tube has a closed end distal from the end connected to the outlet line (preferably at the top), or wherein one end of the inner tube is connected to the outlet line and one end of the outer tube is connected to the feed line, wherein the outer tube has a closed end distal from the end connected to the feed line, and the other end of the inner tube has an opening and is located near the closed top of the outer tube and the length of the inner tube within the outer tube is shorter than the outer tube. This creates a section in which the liquid flow is reversed in direction.

In further embodiments of the channel , the inner or riser tube is placed co-axially with respect to the return or outer tube and vice versa.

In another embodiment, the channel may comprise one tube in which the liquid flows up (or down) and a plurality of tubes in which the liquid flows down (or up). The tubes can be of different diameter to accommodate this. See in this respect FIG. 3C.

In yet another embodiment, the channel may be provided as a solid block or cylinder in which channels are provided through the block or cylinder to accommodate integrated up-flow, flow reversal and down-flow (FIG. 3C).). The block design can be optimised for optimal fuel distribution, and can also contain moderating elements, and/or is itself composed of a moderating material.

It is preferred that the channel accommodates up- and down-flow, and a flow direction reversal section is important, as it can allow disconnecting the entire channel at the end location, where it is connected to the rest of the circuit, preferably the lower end. The same applies to containments encompassing the channel, that can also be connected at the same end, preferably the lower end, to form an enclosure that can be replaced by disconnecting the containment, and moving the containment vertically out of the reactor through the upper neutron reflector and/or radiation shield of the reactor containment.

A nuclear reactor circuit comprising a loop that contains a channel may contain or be connected to other elements and/or functionalities such as heat exchangers, pumps, chemical processing means etc. essentially as explained herein elsewhere, to form an individual independent circuit.

The present invention in another aspect pertains to a nuclear reactor comprising a core area and a shell area and wherein the reactor is composed of a plurality of separate and individual nuclear reactor circuits or modules, each circuit comprising a loop (3), wherein the loop (3) is capable of containing a liquid containing, and optionally circulating, fertile and/or fissile materials as a nuclear fuel, wherein the loop contains a, preferably substantially straight, channel (4) that is part of the loop and that is arranged in a substantial vertical arrangement, wherein the channel provides an up-and-down passage (4a,4b) for the liquid in the loop wherein each of the channels of the plurality of circuits is arranged in the core area and wherein each circuit is independently removable from the nuclear reactor Thus, the nuclear reactor comprises a core area (1) and a shell area (2). The core area is surrounded by the shell area. The shell area can have functionality as a neutron reflector, a radiation shield or a neutron absorbing blanket to generate materials and isotopes by neutron activation, or a combination of these functionalities. Blanket functionality of the shell can be achieved by circuits supplying and retrieving fluid to the shell containing target materials for neutron activation. In the nuclear reactor a plurality of nuclear reactor circuits are provided. The channel is the part of the circuit located in the reactor critical zone, i.e. subjected to neutron flux.

Figure 1:
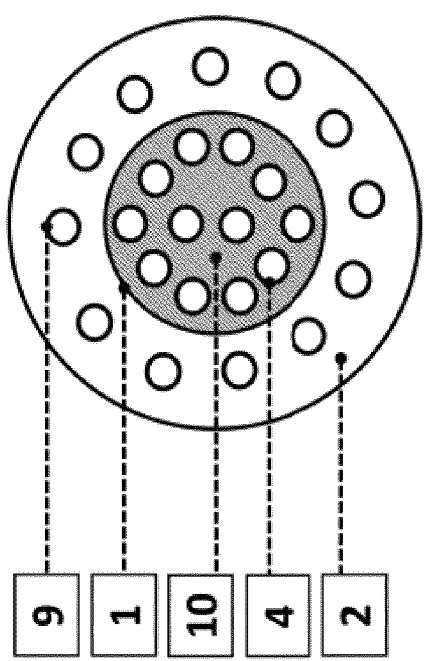
FIG. 1 shows a schematic representation of a top view of the nuclear reactor wherein channels are placed in the core of the reactor.
Figure 4:
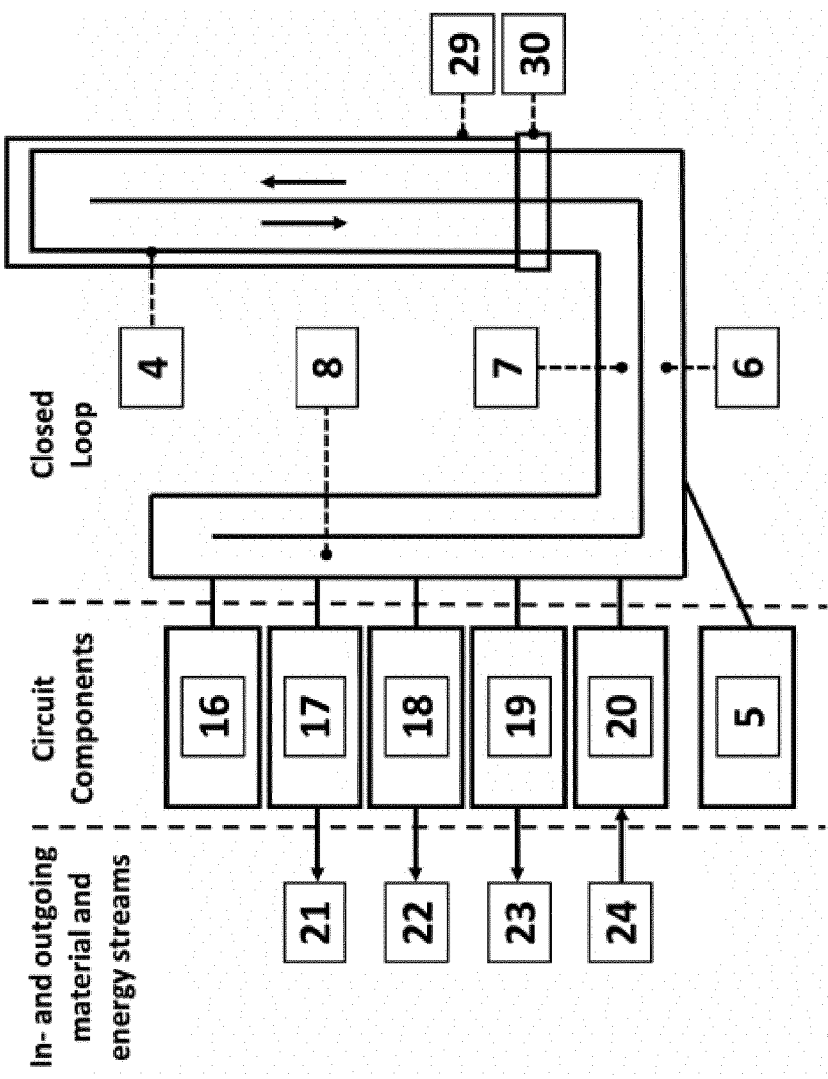
FIG. 4 shows a schematic representation of components and in-out streams of a nuclear reactor circuit.
Figure 5:
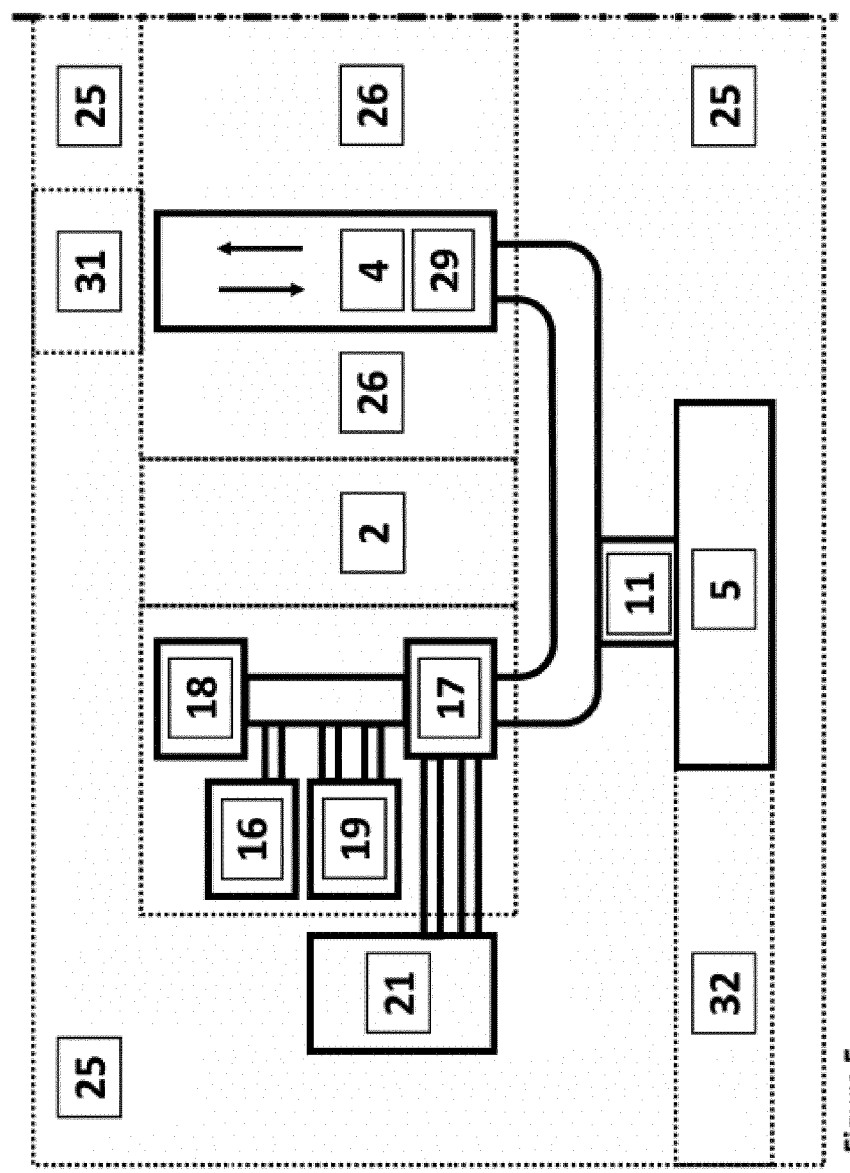
FIG. 5 shows schematic representation of a side view of one nuclear reactor circuit.
Figure 6:
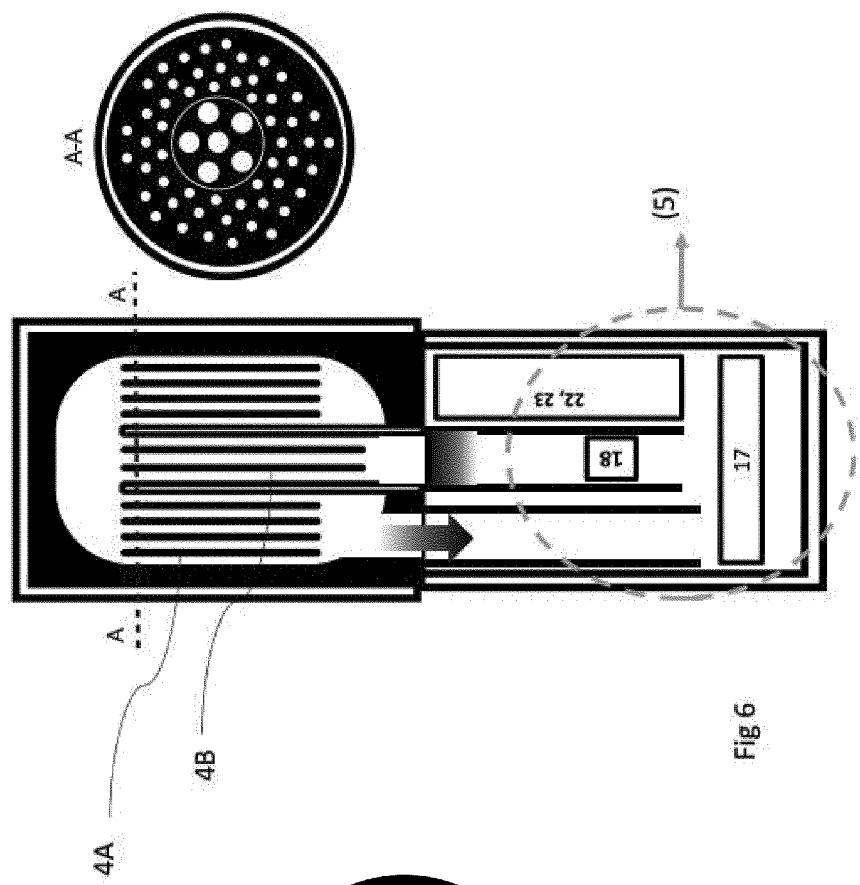
FIG. 6 shows a schematic representation in side view (left) and top view (right) of a nuclear reactor circuit in a cylindrical constellation. In the upper part the channels are located in a circular placement with vertical up and down channels. Pumps, heat exchangers, expansion tanks and fission product extraction, storage units and instrumentation are placed in the lower part below the channels, outside the neutron flux field. The top view shows preferred placement of the up and down channels.
Figure 7C:
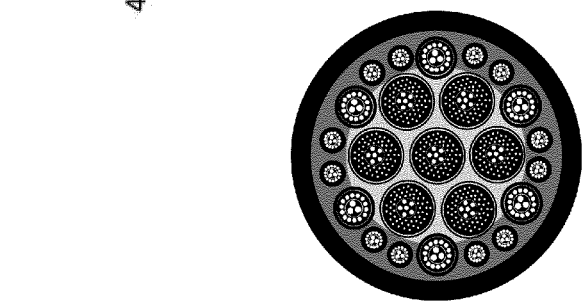
FIG. 7C shows an embodiment wherein around the circular core region of the reactor, a number of alternative circuits are placed, that can either contribute to the fission reaction in the core region, or have another function such as fuel generation by breeding or neutron activation, making use of the neutrons coming out of the core zone radially. In case neutrons are mainly absorbed and not generated by the circumferential circuits, they form the so-called shell (or blanket) area of the reactor.
Figure 7A:
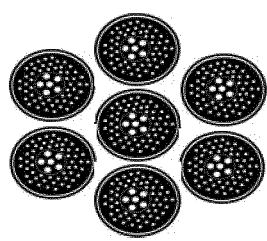
FIG. 7A shows the individual placement of the nuclear reactor circuits (here 7 circuits in a circular configuration) in an embodiment of the invention. When the individual circuits are placed in each other proximity, the channels of each individual circuit are also placed in each other proximity, and criticality can be achieved by selection the appropriate amount and concentration of fuel in the channels. The circuits are removable from the cinfuguration.
Figure 7B:
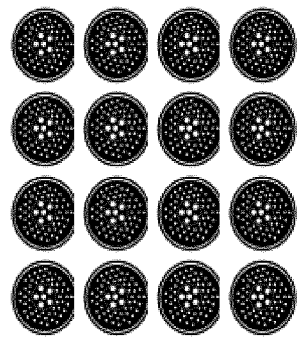
FIG. 7B shows the placement of the circuits in the reactor in a square array.

The nuclear reactor is built up from a group (plurality) of individual nuclear reactor circuits. The circuits are separate circuits or modules and are removable from the reactor without interference with other modules. The channels of the circuits are arranged in each others vicinity. The plurality of circuits can be placed in a configuration to form the reactor, such as a circular, rectangular or other configuration. A circular configuration is preferred. The channels of the circuits can be located at the smaller distance from each other (i.e. in closer proximity to each other) than other elements that make up the circuit. An effective visualization is that, with a reactor having a pie shape in top view, the individual circuits form pieces of the pie, each with the channel of the circuit towards the centre of the pie. This effectively places the other elements of the circuit outside or more distant from the critical zone of the reactor. A circuit may contain multiple channels. In a circular configuration, the channel would be at a smaller radius from the centre of the reactor than the other elements. The channels together form a critical zone, being the reactor core. In certain embodiments, the channels can be placed in multiple circles, to form the critical zone. Another circle of channels (9) may surround the critical zone. The critical zone is surrounded by a shell area which can provide neutron reflector, neutron moderator, radiation shielding or blanket functionality. Blanket functionality can be achieved by additional circuits that provide blanket target material to channels (9) that are located in the shell area surrounding the critical zone. The blanket can be used to generate fissile material (breeding) from fertile material, or to make isotopes for a variety of purposes. The blanket functionality can be provided by channels having the same or different geometries (cross section) than the channels (4) used in the core. The channels of a circuit, both in the core (4) and outside the core (9), in the shell, may have geometries (cross sections) that are circular (as shown in FIG. 1), but may also be, independently, oval and/or elliptical. Channels in the shell area can be intended for absorbing neutrons from the critical zone of the reactor, and depending on their purpose, can have a very different configuration than core circuit channels, dedicated and optimized for their function. The channels may each independently contain a liquid that may contain fertile and/or fissile material or another target material to be activated by the neutron flux in the shell area. To adequately bring the core of the reactor to criticality, selected or all circuits may individually provide a sub-critical amount of nuclear fuel to the critical zone of the reactor. The combined channels in the core (and optional moderating materials in the channels and/or in the between the channels) then provide sufficient critical mass and moderation such that criticality is achieved in the core of the reactor. Criticality is strongly temperature dependent, leading to reduced fission material density in the channels in case temperature increases and the other way around, thus passively adding safety control to the fission reaction. To further control or stop the fission reaction, control rods can introduce or remove neutron absorption materials from the core region by movement in between or close to channels, in moderator materials if present in between channels, or in the shell area.

In certain embodiments, the core contains 2 or more, 4 or more, 6 or more, 10 or more or 25 or more, preferably between 6 and 20 channels. In certain embodiments, the reactor contains 2 or more, 4 or more, 6 or more, 8 or more or 10 or more circuits.

In a typical embodiment, the reactor is based on multiple, individual circuits containing loops, that can be placed in a circular arrangement, with one part of each circuit located at small radii ("the channel " or "hot leg"), creating a critical configuration sustaining a nuclear reaction ("the critical zone"), and with the rest of the circuit (other elements, functionalities) located at larger distance or radius, largely outside the radiation field of the critical zone, in a non-critical configuration.

The channel is a separate and separable component, that can be disconnected, removed and replaced. The channel containment (29) is a separate component, that can be disconnected, removed and replaced. The channel containment may comprise multiple encompassing containments. In between channel containment(s) and the channel, inert gas can be present that can provide thermal insulation, can be monitored for fission products or other salt (volatile) ingredients to detect leakage, and could be adopted for channel (pre-) heating by sweeping the space between the channel containments and the channel with hot gas. The channel and/or the containment are individual components that can be individually disconnected, removed and replaced. The channel may be (partially) enveloped by one or more individual containments. Alternatively, the entire circuit can be removed from the core region for replacement.

Each of the channels, preferably with containments, of the plurality of circuits is arranged in the core area. In certain embodiments, the core area may contain a moderator (10). A moderator (10) can be located in between or surrounding the channels. In this way, the channels (and moderator) together form the critical zone of the core of the reactor. A suitable moderator can be any low atomic weight solid material with a low neutron absorption, including carbon based materials.

In certain embodiments, it is possible to provide the nuclear reactor without a moderator, a so-called fast reactor, providing a fast neutron spectrum. Although these type of reactors have certain technical issues such as the quick degradation of materials, the concept using the circuits of the invention would allow the relative quick and easy replacement of primary materials that form the circuits, such as the channels and the channel containments from the circuits, or the circuit entirely.

In a number of applications that need a more epi-thermal spectrum (more thermal than fast neutrons, such as a thorium cycle), or thermal spectrum, it is preferred to have the reactor contain a moderator.

Moderation can further be added by the material choice of the channels and channel containments, and by adding moderating material in between the circuit channels, or can be minimized, by adopting non-moderating materials in the circuits, and fill the space in between circuit channels with a non-moderating medium or material.

Criticality in this respect refers to the normal operating condition of a nuclear reactor, in which the nuclear fuel sustains a fission reaction. A reactor achieves criticality, (and is said to be critical) when each fission event releases a sufficient number of neutrons to sustain an ongoing series of nuclear fission reactions.

The channels of the reactor can be arranged in such a way that each of the channels (and the liquid therein) experiences a similar neutron flux and neutron spectrum. Alternatively, the critical zones can be arranged such that each channel in the critical zone can experience a different flux and/or different neutron spectrum. Such an arrangement can be useful in case a specific neutron flux is needed for a particular critical zone, for instance a zone in which the channel is located that is part of a circuit that is dedicated to the generation of specific isotopes by neutron activation, or by using neutrons/neutron absorption to convert fertile elements into fissile elements.

Contrary to conventional nuclear reactors, the criticality and hence the fission chain reaction can be already adequately stopped or down-regulated by interfering with one or more of the circuits instead of requiring interference with all circuits in the reactor to bring the entire core into a state of non-criticality. In this way not all circuits have to be put 'off-line' or down-regulated. This can be very convenient in terms of maintenance and safety. For illustration, consider a reactor containing 10 circuits that each contribute 10% of the critical amount of nuclear material to the core such that criticality is achieved for the core. In case of an emergency, only one circuit needs to be taken off-line (draining its content into the liquid tank(s)) and the entire reactor becomes non-critical while the other 9 circuits can remain unaffected.

In a further aspect, the invention provides a method of operating a nuclear reactor comprising a plurality of individual nuclear reactor circuits of the present invention. The method makes use of the flexibility that a nuclear reactor comprising a plurality of nuclear reactor circuits can provide.

The method further comprises providing a plurality of nuclear fuels or target materials containing fertile materials and/or fissile materials and/or other materials to be activated by neutron flux, and providing the plurality of nuclear fuels and/or target materials to the plurality of circuits. The method further comprises providing a plurality of nuclear fuels containing fertile and/or fissile materials to the circuits, preferably to each of the circuits. The nuclear fuel in the channels of the circuits is brought into a critical configuration.

A critical reactor core can be formed by the channels of the circuits, introducing fissile material in adequate quantities and in an appropriate configuration in the reactor core region. The reactor spectrum can be moderated by salt, channel materials, containment materials and/or a dedicated moderator in between or around circuit channel.

Moderation can be tuned to the neutron spectrum desired, either a fast neutron spectrum reactor core (minimized moderation), or an (epi-)thermal neutron spectrum reactor core, or different dedicated neutron spectra in separate sections in the core region to optimize fission, breeding or activation in different circuits in different locations.

The modular core reactor system also allows changing individual circuits from a breeding to a breeding-burning function, and from a burning to a breeding function, step by step. In case the majority of the circuits supply adequate criticality to sustain a nuclear fission reaction in the core region for example by fission of $^{235}$U (burning), one or more circuits can use excess neutrons from the fission reaction in the core for example to convert/transmute fissile $^{233}$U from fertile $^{232}$Th ('breeding'), until a breeding-burning equilibrium is established in the circuit, in which case as much $^{233}$U is generated from $^{232}$Th as is being consumed by the fission reaction. Reactor and circuit neutron economy need to be sufficiently optimized to avoid too much loss of neutrons. Circuits formerly adopted mainly for burning, can then be changed from a regular burning function to a breeding function, by changing the salt, or adding thorium to the salt. Over time, this circuit would then change from a breeding to a breeding-burning circuit ultimately achieving breed-burn equilibrium. In this way the reactor is converted step by step towards operating on a closed thorium cycle, in which $^{232}$Th is converted to $^{233}$U fuel, requiring no or minor addition of fissile material to reactor circuits to sustain the fission reaction.

The present invention may provide a method for closing the Uranium-Plutonium cycle, in which ultimately the fission reaction in the critical reactor zone, can be sustained by Plutonium fission, and excess neutrons are used to transmute fertile $^{238}$U to fissile $^{239}$Pu in adequate amounts.

The present invention may provide a method that can be used for burning long-lived isotopes that have been retrieved from nuclear waste to reduce nuclear waste lifetime. In this case the reactor is critical, but one or more circuits either in critical zone/core are or shell area have a specific salt composition, in which these long-lived isotopes extracted from nuclear waste can be transmuted and/or fissioned into short- to medium-lived isotopes and fission products. The present invention may provide a method for producing specific isotopes by neutron activation of specific elements. In this case the reactor is critical, but one or more circuits either in critical zone/core area or shell area have a specific salt composition, in which these target materials are included, and the desired activation products are extracted from the circuit to be used for the application foreseen.

The advantage of the approach from (closed) nuclear fuel cycle perspective of the present invention, both in the circuit as in the reactor is the combination of:
 adoption of molten salt, allowing online salt clean up and conditioning, and by removal of neutron absorbing fission or activation products, optimizing neutron economy by minimizing neutron absorption losses. Potential non-proliferation issues with material extraction should be and can be managed by design.

adoption of individual channel of the circuits together forming the critical zone, allowing in principle each circuit to contain a different salt mixture and fertile-fissile material content, which can be changed by salt adjustment or replacement.

Conventional reactor systems, mostly operated with solid fuel types, do not have the possibility to minimize neutron absorption of activation and fission products by removal of the fission products, as these are contained in the fuel, and can be removed only by elaborate solid fuel reprocessing at a separate location, and do not have the flexibility to (partly) change, optimize or tune core content conveniently. The circuit and reactor of the invention allows for removal of fission products.

Conventional molten salt reactor systems mostly operate with one salt volume, which makes step by step salt composition adjustment complex, as the change affects the whole salt volume, in which the salt has a non-optimized and non-localized breeding and burning function. The reactor and circuit of the invention allows for operation with a variety of salts and allow step-by-step salt composition adjustment relatively easy and convenient.

The above benefits of the modular core reactor system compared to other molten salt reactor designs, are in addition to the disadvantages of handling large salt volumes, such as large components, that are hard to replace and degrade rapidly in a molten salt reactor environment, limited insight in where the fuel is located, problematic qualification and licensing route, in which small scale testing cannot be easily extrapolated to full scale operation, and limited flexibility in optimizing reactor performance by replacement of optimized components, all of which is avoided by adopting a modular core reactor system of the invention.

It will be clear that with a nuclear reactor that is composed of individual nuclear reactor circuits, elements and embodiments that have been described in relation to the nuclear reactor circuit also form elements and embodiments of the nuclear reactor, and that elements and embodiments of the nuclear reactor that are part of or related to the nuclear reactor circuit, are also elements and embodiments of the nuclear reactor circuit.

The invention further relates to a method of operating a nuclear reactor circuit as described herein elsewhere by providing the nuclear reactor circuit, arranging the channel of a nuclear reactor circuit near the core of another (test) nuclear reactor such that a critical zone of the channel of the circuit is exposed to the radiation flux of the other reactor. The method further details providing a liquid to the circuit, circulating the liquid through the circuit, and subjecting the liquid to the flux of the test nuclear reactor in the channel. The method further comprises monitoring the performance of (elements of) the circuit and/or the liquid (which may be a molten salt and can contain fissile and/or fertile materials or other chemical elements). The method may further comprise providing a nuclear fuel containing fissile and/or fertile materials. The nuclear fuel may be provided to the circuit. The nuclear fuel may be circulated in the circuit and can be subjected to the radiation flux of the other reactor, preferably in the critical zone.

By placing the nuclear reactor circuit, and in particular the channel of the circuit within the neutron flux of another nuclear reactor, the set-up, the materials from which the circuit is made, and/or the liquid (molten salts) and/or the fertile and fissile material in the nuclear fuel, can be tested and qualified, either in combination or in isolation. For instance, in one embodiment, the method may comprise providing a circuit as described herein elsewhere, providing a liquid (preferably a molten salt) and exposing the circuit and the liquid to the flux of the existing nuclear reactor to monitor, test and experiment with the behaviour of the circuit's material, the liquid and the performance of the circuit as whole. The data thus obtained are useful in improving the circuit in itself, the composition of the liquids used in the circuit and, ultimately, in the further design and optimisation of the nuclear reactor of the invention.

Thus in certain embodiments of the invention, the parameters for (components of) the circuit, are from amongst others behavior of materials exposed to degradation mechanisms under molten salt reactor conditions, such as contact with molten salt, high temperature and (neutron) radiation, typically behavior aspects like corrosion resistance, strength, embrittlement, creep, fracture toughness, thermal expansion, thermal conductivity. Thus in certain embodiments of the invention, the parameters for performance of the liquid, are from amongst others chemical composition, fission product dissolution or deposition, behavior of activation products, degradation/decomposition under radiation, coagulation of elements in the salt, thermal and electrical conductivity, corrosiveness, fluor/chloride potential, viscosity.

Thus in certain embodiments of the invention, the parameters for nuclear fuel, are from amongst others dissolution in molten salt, deposition potential, coagulation with other elements in the salt.

Thus in certain embodiments of the invention, the parameters for performance of the circuit, are from amongst heat generation, safety of operation, heat generation and heat transport efficiency, testing and qualification of circuit components.

By operating the circuit in this way, it also possible to use the circuit of the invention for a large number of applications which will be discussed herein elsewhere, for example, the generation of specific isotopes by neutron activation, of fissile material from fertile material, and so on.

In a particular embodiment, the method may further comprise a step of isotope generation, for instance for medical, diagnostic, or imaging applications. This embodiment would comprise a step providing specific elements to the circuit, subjecting the elements to the neutron flux of the reactor and allowing the elements to transmute into other elements and isolation of the resulting elements from the liquid. The isolation can be online or off-line (i.e. the liquid can be removed from the circuit and the isolation performed elsewhere). In a similar way fission products can be retrieved from circuits in which a fission reaction takes place, for instance for medical, diagnostic, or imaging applications.

The design of the circuit of the invention and the nuclear reactor comprising the circuits of the invention have certain advantages such as, but not limited to:

They allow a replacement strategy and optimization of reactor performance by replacing circuits with improved circuit and circuit channel designs.

Multiple reactor circuits together form the critical zone of the reactor. The critical mass in the critical zone, is therefore partitioned in individual containments. In case a circuit is drained, the critical mass in the critical zone is effectively reduced, thereby reducing or stopping the nuclear reaction.

Individual channels (or circuits) can contain different salt compositions with different fertile, fissile or other materials:

The core configuration of the reactor can be chosen such that individual circuit channels are placed at different locations in the critical zone to serve different purposes, such as fission, breeding and neutron activation, for optimized performance.

The core configuration can be chosen such that individual circuit channels are placed at different locations in the critical zone to generate a neutron flux spectrum flux and distribution to optimize performance for each channel at each location in the reactor.

The salt in a channel can be replaced by another salt composition to change the channel purpose in the reactor critical zone or shell zone.

The production of many relatively small components can be more cost effective than the production of a few very large components. Economy by number can outweigh economy of scale.

Relatively small components allow for convenient testing at representative scales, which facilitates and reduces costs and duration of component and reactor development and qualification.

Unlike other (thermal) molten salt reactor designs, specific moderator materials such as graphite can be located outside and in between the channels, instead of in direct contact with nuclear fuel bearing salts. The moderator function can thus be separated from molten salt flow guide or containment functions. This is especially convenient for graphite, which is a very appropriate moderator, but displays very complicated behaviour in a nuclear reactor environment. As maintenance and life extension measure, a separate moderator around the channels can be subjected to a temperature increase to anneal irradiation damage, either during or in between operation cycles, by which original material properties can be restored. For graphite this can be very effective, securing appropriate properties of the moderator by (repetitive) annealing to an extent that the moderator material does no longer require replacement during the reactor lifetime.

Physical separation of the salt in the channels from the moderator in between the channels also allows for thermal optimisation of the moderator, largely independent from channel and salt temperatures. Moderator material can for example be brought to and kept at other temperatures than the salt or channel temperatures, to minimize the impact of irradiation damage during operation, to maximize lifetime. A graphite moderator could for example be kept a cooler temperature than typical salt temperatures, by which the impact of irradiation damage is reduced, and lifetime is maximised.

As the modular core reactor is formed by an assembly of separate, individual and independent reactor circuits, the system and each individual circuit is composed of relatively small components that operate under low pressure. The system being built from small components allows for example disconnecting the channel from the circuit, and removing it from the circuit into a shielded container, for transport to a site for conditioning, disposal, or, if applicable recycling. After that a new channel (or other element) can be introduced. This could for example take place vertically through the radiation shield on top of the reactor. The same approach can be adopted for other parts and components of the circuit, or of the circuit in its entirety.

REFERENCE NUMERALS

1. Core area
2. Shell area
3. Loop
4. channel
4a. Up channel
4b. Down channel
5. Liquid tank
6. Feed line
7. Outlet line
8. Return line
9. shell channel
10. Moderator or non-moderating medium
11. Active or passive valve (Freeze plug) to liquid tank
12. Up tube
13. Down tube
14. Inner tube
15. Outer tube
16. Expansion tank
17. Heat exchanger
18. Pump
19. Processing
20. Material feed
21. Secondary heat system
22. Fission and activation products
23. Fission and activation products
24. Fertile, fissile and target materials
25. Shield
26. Critical zone
27. Single up tube
28. Multiple down tubes
29. channel containment
30. Channel containment-loop connection
31. Passage through neutron reflector and/or radiation shield for channel and channel containment for removal/replacement.
32. Passage through neutron reflector and/or radiation shield for liquid tank removal/replacement.

The invention claimed is:

1. A nuclear reactor comprising
a core area and a shell area;
a plurality of separate and individual nuclear reactor circuits, each circuit comprising:
a containment;
a loop comprising a liquid comprising a nuclear fuel comprising molten salt,
wherein the loop comprises a channel that is arranged in a substantial vertical arrangement within the containment, wherein the channel provides an up-and-down passage for the liquid in the loop,
wherein each of the channels of the plurality of circuits is arranged in the core area,
wherein each separate and individual nuclear reactor circuit is independently replaceable from the nuclear reactor while maintaining a capability to contain the liquid, and
wherein the containment has a sidewall with an inner surface spaced from the loop.

2. The nuclear reactor according to claim 1, wherein an individual circuit contains a sub-critical amount of nuclear fuel in a critical zone of the core area of the reactor.

3. The nuclear reactor according to claim 1, wherein the plurality of separate and individual nuclear reactor circuits are configured to provide a critical amount of fuel in the reactor such that a nuclear reaction can be maintained.

4. The nuclear reactor according to claim 1, wherein the channel in the circuit is a single pipe, a pipe bundle, or a pipe-in-pipe.

5. The nuclear reactor according to claim 1, wherein a top edge or a bottom edge of the containment is releasably connected to the core area.

6. The nuclear reactor according to claim 2, wherein the arrangement of the channels form the critical zone of the nuclear reactor.

7. The nuclear reactor according to claim 2, wherein each channel contains a sub-critical amount of nuclear fuel in the critical zone of the reactor.

8. The nuclear reactor according to claim 2, wherein the critical zone of the reactor further comprises a moderator.

9. The nuclear reactor according to claim 1, wherein the channels are arranged in a moderator.

10. A method of operating a nuclear reactor, the method comprising the steps of
providing the nuclear reactor as defined in claim 1 comprising multiple circuits; and
bringing the nuclear fuel in the channels of the circuits in a critical configuration.

11. The method according to claim 10, comprising the steps of
circulating the nuclear fuel in the circuits; and
subjecting the nuclear fuel of each circuit to the neutron flux of other circuits in a critical zone of the nuclear reactor.

12. The method according to claim 10, further comprising the steps of:
operating the reactor in a critical configuration, wherein at least part of the circuits provide fission material to the critical zone, to sustain a fission reaction;
operating part of the circuits in a breeding-burning mode in the critical zone, wherein excess neutrons from the fission reaction are allowed to generate fissionable material from fertile materials and fission at least part of the fissionable materials generated;
establishing an equilibrium between breeding and burning in one or more first circuits of the multiple circuits;
replacing the liquid in one or more of second circuits of the multiple circuits thereby changing the second circuits from a burning to a breeding mode; and
thereby providing a reactor system that operates in a closed breed-burn nuclear fuel cycle.

13. The method according to claim 11, further comprising
placing the nuclear reactor circuits in a nuclear reactor configuration,
replacing one of the nuclear reactor circuits from the shell or core area of the nuclear reactor.

14. The method according to claim 13, wherein the replacement is performed by a substantially vertical translocation of the respective circuit.

15. A nuclear reactor, comprising:
a core area and a shell area;
a plurality of separate and individual nuclear reactor circuits, each circuit containing molten salts and comprising:
a containment;
a loop, wherein the loop contains a liquid comprising a nuclear fuel comprising the molten salts,
wherein the loop contains a channel that is arranged in a substantial vertical arrangement within the containment, wherein the channel provides an up-and-down passage for the liquid in the loop,
wherein each of the channels of the plurality of circuits is arranged in the core area, and
wherein each separate and individual nuclear reactor circuit is independently replaceable from the nuclear reactor,
wherein each separate and individual nuclear reactor circuit is movable relative to the core so as to be independently removable from the nuclear reactor, and
wherein the containment has a sidewall with an inner surface spaced from the loop.

16. A nuclear reactor, comprising:
a core area and a shell area;
a plurality of separate and individual nuclear reactor circuits, each circuit containing molten salts and comprising:
a containment;
a loop, wherein the loop contains a liquid comprising a nuclear fuel comprising the molten salts,
wherein the loop comprises a channel that is arranged in a substantial vertical arrangement within the containment, wherein the channel provides an up-and-down passage for the liquid in the loop,
wherein each of the channels of the plurality of circuits is arranged in the core area,
wherein each separate and individual nuclear reactor circuit is independently replaceable from the nuclear reactor in a single piece, and
wherein the containment has a sidewall with an inner surface spaced from the loop.

* * * * *